UNITED STATES PATENT OFFICE 2,186,722

DIAZONIUM COMPOUNDS AND PROCESS OF MANUFACTURING THE SAME

Ivan Gubelmann, Wilmington, Del., and John M. Tinker, Penns Grove, and Louis Spiegler, Woodbury, N. J., assignors to E. I. du Pont de Nemours & Company, Wilmington, Del., a corporation of Delaware No Drawing. Application January 12, 1938, Serial No. 184,566

8 Claims. (Cl. 260—141)

This invention relates to stable nitro-aryl diazonium compounds which can be employed as intermediates in the manufacture of azo dyes, and especially to new processes for making the compounds.

Nitro aryl amines do not dissolve readily in dilute acids which are customarily used as media for diazotization. Heretofore, substantially complete diazotization of nitro aryl amines in such media was attained generally by grinding the amine to minute particles, suspending the particles in a large volume of the dilute acid and then adding sodium nitrite. The diazotization was a prolonged tedious process requiring the use of much process apparatus and a large capital investment in such apparatus per unit of product manufactured. After the diazonium compound was made it was necessary to apply a second process if a stabilized product was required. The methods employed were costly and it was desirable to provide improved products and processes which would be technically satisfactory and economically feasible.

It is among the objects of this invention to provide new stable diazonium compounds and new processes for producing the same. Another object of the invention is to provide new processes for making nitrated normal diazonium compounds. Other objects of the invention will be apparent from the following more detailed description.

The invention will be more fully set forth in the following more detailed description which includes examples that are given as illustrative embodiments of the invention and not as limitations thereof.

Example I 56 parts of the aniline salt of 2,7-disulfo anthraquinone were stirred into 270 parts of 93% sulfuric acid until the mass was thick and creamy in consistency. The mixture was cooled gradually to 0° C. 14 parts of finely powdered dry sodium nitrite (NaNO₂) were added to the mixture over a 3–4 hour period, after which 37 parts of a nitrating acid containing 36.2% of nitric acid, 58% sulfuric acid, and 6% of water were gradually introduced dropwise whilst retaining the reaction mixture at 0°–5° C. The mixture was stirred for 2–3 hours until the nitric acid was fully consumed. The precipitate was stabilized aryl sulfonic acid complex salt of the diazonium nitraniline and was separated by filtration and dried. In this condition the salt was stable in air and could be stored in readiness for use in any desired reaction of the diazonium compound, such as a Sandmeyer coupling.

The product was essentially the anthraquinone-2,7-disulfonic acid salt of diazonium-paranitraniline and it produced the same shade and quality of colors as those produced in known normal coupling reactions with diazotized paranitraniline.

The aniline salt of 2,7-disulfo-anthraquinone may be prepared by adding a quantity of 2,7,-disulfo-anthraquinone to two equivalents of aniline which are dissolved in a mineral acid and diluted, such as hydrochloric or sulfuric acid. The salt forms a precipitate in the dilute acid and can be filtered off. Arylamine salts of other aryloxysulfonic acids can be prepared similarly.

Example II

It is not necessary to prepare the aryl sulfonic acid salt of the amine prior to diazotization and nitration as described in Example I. It has been found that the introduction of sufficient sulfonic acid to form the aryl sulfonic acid salt of diazonium-para-nitraniline prior to or during the diazotization reaction will result in a successful and satisfactory preparation of the nitrated diazonium compound. The following is illustrative:

To 400 parts of concentrated sulfuric acid which was cooled below 30° C. by external cooling were added 38 parts of aniline, 5 parts of 2:7 anthraquinone disulfonic acid sodium salt, and 28 parts of sodium nitrite. The mass was stirred overnight at 0°–5° C. until a portion diluted with ice and water gave no test for free nitrous acid with starch iodide solution. 43 parts of 63% HNO₃ were then added dropwise to mono-nitrate the diazo benzene, whilst maintaining the solution at 0° to 5° C. The process was carried on from this point as described in Example I. The product was the same as that obtained in Example I.

Example III

The nitration of diazonium salts can be performed in anhydrous hydrogen fluoride without adding sulfonic acids or the salts thereof, as follows:

45 parts of anhydrous hydrogen fluoride were charged into a stainless steel or iron pot which was provided with an agitator. 9 parts of aniline were added very slowly at 0–10° C. while stirring. 7 g. of powdered sodium nitrite were then added in small portions. The diazotization proceeded rapidly and the mixture was stirred until it gave no test for free nitrous acid. Test samples of the reaction mass when diluted with water coupled normally with naphthol sulfonic acids to form colored compounds. The free hydrogen fluoride was removed from test samples by evaporation of the acid in air. The diazo product obtained had no explosive properties. It was stable in air and soluble.

The nitration of the diazonium fluoride in the hydrogen fluoride solution was accomplished by adding to the diazotized mixture small portions of an intimate mixture of 9 parts sodium nitrate, and 9 g. of ammonium fluoride (finely powdered), and maintaining the temperature at 0°–5° C. A smooth mono-nitration with no evidence of decomposition or formation of tar was obtained. Upon dilution, the solution of nitrated diazonium compound coupled normally with azo dye coupling components and produced coupling products normally expected from diazo-p-nitraniline.

Various modifications can be made in the processes of the invention. For example, concentrated sulfuric and hydrofluoric acid media are used. Good results are obtained with concentrations of these acids ranging from about 75% to 100%. As the nitrating agent concentrated nitric acid, inorganic nitrates which yield nitric acid in the acid reaction media such as alkali metal nitrates and ammonium nitrate, gaseous oxides of nitrogen passed through the reaction medium, and various nitrating mixtures of nitric and sulfuric acids containing 30% to 40% of nitric acid can be used instead of the nitrating agents recited in the examples.

It is preferable to avoid using a large excess of nitrating agent over that required to give the desired amount of nitration, but occasionally an excess of as much as 10% of nitrating agent is desirable to complete the nitration. In mono-nitrating, an excess of nitrating acid sufficient to form dinitro derivatives should in general be avoided. In the processes described dinitro and trinitro derivatives can be readily formed by adding sufficient nitrating agent to produce them.

The quantity of sulfuric acid or hydrofluoric acid used in the reaction mixture should be at least sufficient to produce a mixture that can be easily stirred as it is necessary to cool the reaction in order to avoid overheating, and the possibility of forming undesired by-products during nitration. In general, about 5 to about 20 parts by weight of acid as referred to the weight of the amine is sufficient in most all cases, but more or less can be used.

The temperature of the reaction medium is desirably kept at a low level to avoid decomposition of the diazonium compounds and loss of oxides of nitrogen. Temperatures of 0° to 5° C. are preferred, but even lower temperatures and temperatures up to about 25° C. can be used. The rate of nitration depends primarily on the temperature and it can be varied accordingly.

Any of the primary arylamines of the benzene and naphthalene series which are substituted once or more than once by any or all of the groups, alkyl, alkoxy or halogen, as well as those which are unsubstituted can be used to produce normal diazonium compounds by the processes of the invention, provided there is at least one free hydrogen in the aryl nucleus. However, for the best results the unsubstituted aryls and those which have from 1 to 3 substituents selected from the described group are used. In the specification and claims halogen refers to chlorine, bromine, iodine and fluorine; alkyl refers to saturated aliphatic groups, such as methyl, ethyl, propyl, butyl and pentyl, and alkoxy refers to the corresponding alkyl ether radicals. Arylamines which are substituted by other groups than alkyl, alkoxy and halogen do not give the desired results with applicants' process, since the process does not produce normal diazonium compounds therewith.

Other aryl sulfonic acids can be used instead of the anthraquinone disulfonic acid recited in Examples I and II, such as the mono-, di- and tri-sulfonic acids of the benzene, naphthalene and anthraquinone series, among which the following are mentioned as illustrations. Meta-nitrobenzene sulfonic acid, alpha-naphthalene sulfonic acid, beta-naphthalene sulfonic acid, and 1,5-naphthalene-disulfonic acid, but other mono-, di- and trisulfonic acids of the benzene, naphthalene and anthraquinone series can be used. Instead of adding the previously prepared and isolated aryl sulfonic acid to the reaction mixture, the compound can be added thereto, in conjunction with the reaction mixture in which the aryl compound is sulfonated. These and many other variations can be made in the processes without departing from the invention.

Since from the foregoing description of the invention it will be apparent to those skilled in the art that various other embodiments of the invention may be made without departing from the spirit and scope thereof, it is to be understood that no limitations are intended except those which are specifically recited in the annexed claims or are imposed by the prior art.

We claim:

1. The process which comprises adding a nitrating agent to a reaction medium containing an acid of the group consisting of hydrofluoric acid of 75% to 100% strength and sulfuric acid of 75% to 100% strength, said medium having dissolved therein a compound represented by the formula

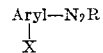

in which Aryl is the radical of one of the group consisting of benzene and naphthalene, X is one of the group consisting of hydrogen, saturated aliphatic alkyl and alkoxy radicals having 1 to 5 carbons and halogen, and R is the anion of one of the group consisting of hydrofluoric acid, mono-, di-, and tri-sulfonic acids of benzene, naphthalene and anthraquinone, said nitrating agent being added in at least sufficient quantity to mono-nitrate said aryl diazo compound, and said reaction medium being maintained at 0° C. to 25° C. until a normal mono-nitro-aryl diazonium compound is formed.

2. The process which comprises adding a nitrating agent to a reaction medium containing an acid of the group consisting of hydrofluoric acid of 75% to 100% strength and sulfuric acid of 75% to 100% strength, said medium having dissolved therein a compound represented by the formula

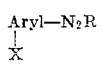

in which Aryl is the radical of one of the group consisting of benzene and naphthalene, X is one of the group consisting of hydrogen, saturated aliphatic alkyl and alkoxy radicals having 1 to 5 carbons, and halogen, and R is the anion of one of the group consisting of hydrofluoric acid, mono-, di-, and tri-sulfonic acids of benzene, naphthalene and anthraquinone, said nitrating agent being added in at least sufficient quantity to mono-nitrate said aryl diazo compound, and said reaction medium being maintained at 0° C. to 5° C. until a normal mono-nitro-aryl diazonium compound is formed.

3. The process which comprises dissolving a compound represented by the formula

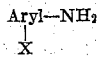

in which Aryl is a radical of the group consisting of benzene and naphthalene and X is at least one of the group consisting of hydrogen, saturated aliphatic alkyl and alkoxy radicals having 1 to 5 carbons and halogen in anhydrous hydrofluoric acid, adding a diazotization agent whilst maintaining a temperature not exceeding 25° C. until the amine is diazotized, and then adding a nitrating agent whilst maintaining a temperature not exceeding 25° C. until a normal mono-nitrated diazonium compound is formed.

4. The process which comprises adding a nitrating agent to a reaction medium containing anhydrous hydrofluoric acid and an aryl diazonium salt of hydrofluoric acid, said aryl diazonium salt being from a diazotized primary aryl amine of the group represented by the formula

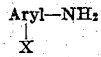

in which Aryl is an aryl nucleus from the benzene and naphthalene series, and X is one of the group consisting of hydrogen, saturated aliphatic alkyl and alkoxy radicals having 1 to 5 carbons and halogen, said nitrating agent being present in at least sufficient quantity to mono-nitrate the aryl nucleus of said aryl diazonium salt, and said nitration being carried out at mono-nitrating temperatures until the aryl nucleus of said diazonium salt is mono-nitrated.

5. The process which comprises adding to a mixture of anhydrous hydrofluoric acid and benzene diazonium fluoride, at least sufficient sodium nitrate to mono-nitrate said benzene nucleus, and maintaining the temperature of the mixture between 0° and 5° C. until the diazonium compound is mono-nitrated.

6. The process which comprises dissolving a compound represented by the formula

in which Aryl is a radical of the group consisting of benzene and naphthalene, and X is at least one of the group consisting of hydrogen, saturated aliphatic alkyl and alkoxy radicals having 1 to 5 carbons and halogen, in sulfuric acid of at least 93% strength which contains an aryl sulfonic acid from the group consisting of sulfonic acids of the benzene, naphthalene and anthraquinone series, diazotizing, and then adding a nitrating agent whilst maintaining a temperature not exceeding 25° C. until a normal mono-nitrated aryl diazonium compound is formed.

7. The process which comprises adding a nitrating agent to a sulfuric acid medium containing at least 93% sulfuric acid and an aryl diazonium salt of an anthraquinone disulfonic acid, said aryl diazonium salt being from a diazotized primary amine of the group represented by the formula

in which Aryl is an aryl nucleus from the benzene acid naphthalene series and X is at least one of the group consisting of hydrogen, saturated aliphatic alkyl and alkoxy radicals having 1 to 5 carbons and halogen, said nitrating agent being present in at least sufficient quantity to mono-nitrate the aryl nucleus of said aryl diazonium salt, and said nitration being carried out at mono-nitrating temperatures until the aryl nucleus of said diazonium salt is mono-nitrated.

8. The process which comprises adding a nitrating agent to a mixture of 93% sulfuric acid and an anthraquinone disulfonic acid salt of diazo benzene, and maintaining the temperature of the mixture between 0° and 5° C. until an anthraquinone-disulfonic acid salt of diazonium-para-nitraniline is formed.

IVAN GUBELMANN.
JOHN M. TINKER.
LOUIS SPIEGLER.